Patented Sept. 20, 1938

2,130,579

UNITED STATES PATENT OFFICE 2,130,579

PHOSPHATOVANADATE AND METHOD OF RECOVERY OF THE SAME

Frederic C. Bowman, Los Angeles, Calif., assignor to A. R. Maas Chemical Co., Los Angeles, Calif., a corporation of California No Drawing. Application November 22, 1935, Serial No. 51,076

15 Claims. (Cl. 23—19)

This invention relates to phosphatovanadates and method of recovery of the same from phosphoric acid solutions containing vanadium by the oxidation of vanadium compounds to the pentavalent condition.

A large part of the States of Idaho, Utah, Wyoming and Montana is covered with a huge bed of phosphate rock. This phosphate rock is used in the preparation of phosphoric acid. This deposit of phosphate rock contains what is estimated to be over a million tons of vanadium metal. The value of the vanadium content of this phosphate rock is, at the present valuation of vanadium, estimated to be greater than the value at the mine of the $P_2O_5$ content of the ore.

To date no satisfactory method has been devised for the recovery of the vanadium from this phosphate ore, and at the present time the vanadium content of the ore is given away with the phosphate fertilizer as prepared from this phosphate rock deposit.

It is an object of this invention to provide a method of recovering the vanadium from the phosphoric acid prepared from this phosphate rock such, for example, as from the crude phosphoric acid as prepared by the Anaconda Copper Mining Company.

Analysis of this phosphoric acid of 54% $P_2O_5$ content shows that it contained approximately .56% $V_2O_4$, although of course the vanadium content of the acid is variable between substantially the limits of .48% and .60% $V_2O_4$.

It is an object of this invention to provide a method by which the vanadium may be recovered from phosphoric acid containing vanadium by the oxidation of vanadium compounds present in the phosphoric acid to the pentavalent condition, and to precipitate phosphatovanadate complex compounds.

Another object of this invention is to prepare as a new article of manufacture hydrated phosphate vanadates of crystalline form which will precipitate from solutions of phosphoric acid.

Another object of this invention is to provide a new phosphate vanadate crystal as illustrated by the formula $V_2O_5.P_2O_5.3H_2O$.

Another object of this invention is to provide a new crystalline phosphate vanadate compound having the chemical composition of $$V_2O_5.P_2O_5.4H_2O.$$

Other objects and advantages of this invention it is believed will be apparent from the following detailed description of a preferred embodiment thereof.

I have discovered that vanadium may be recovered from phosphoric acid containing the same by oxidizing the vanadium content of the phosphoric acid to the pentavalent condition and precipitating therefrom phosphate vanadate complex compounds.

I have further discovered that by the oxidation of the vanadium content of phosphoric acid containing vanadium compounds, that there are produced new phosphate and vanadate crystalline hydrates of the chemical composition of

$$V_2O_5.P_2O_5.3H_2O$$

and $V_2O_5.P_2O_5.4H_2O$ and other phosphate vanadate complex compounds differing and varying from those having the true chemical compositions hereinabove set forth, depending upon conditions of oxidation as to temperature and concentration and the oxidizing agents employed which are of different crystalline composition and structure from the phosphate vanadate complex compounds, the chemical formulae for which are hereinabove set forth.

In accordance with the preferred embodiment of my invention, the phosphoric acid containing the vanadium principally as $V_2O_4$ is treated with an oxidizing agent in solution such, for example, as with potassium permanganate in slight excess. The result is that the impurities contained in the phosphoric acid solution as well as the vanadium oxide are all oxidized. The $V_2O_4$ is oxidized to the pentavalent condition to produce a complex vanadium phosphorus compound which is of crystalline structure and which, according to the conditions of concentration and temperature employed, may be one of several phosphate vanadate complex compounds. When phosphoric acid of 50° to 60° Bé. is utilized and an oxidizing agent such as potassium permanganate is employed, apparently all the impurities contained in the phosphoric acid are oxidized with the exception of the $Cr_2O_3$. The solution is allowed to crystallize at about 20° C. and the crystals produced are easily filtered with suction, and when washed with alcohol and chloroform and air-dried, show that there is a mixture of crystals of complex phosphate vanadate hydrates.

Any suitable oxidizing agent may be employed for the purpose of oxidizing the vanadium content of the phosphoric acid to the pentavalent condition and the particular oxidizing agent employed depends primarily upon the conditions met as to the impurities carried in the phosphoric acid other than the vanadium and the cost of utilizing the particular oxidizing agent chosen.

While potassium permanganate is perhaps the most effective of the oxidizing agents, its cost is such as to render it advisable to use, where possible, other oxidizing agents in its place and stead.

I have utilized as oxidizing agents such substances as potassium permanganate, sodium chlorate, bleaching powders, ammonium persulphate, barium dioxide, hydrogen peroxide, sodium bichromate, and lead peroxide.

The potassium permanganate when utilized oxidizes all the impurities contained in the phosphoric acid with the exception of $Cr_2O_3$. The oxidation takes place rapidly and when oxidation is complete, there is a visible color showing that enough of the potassium permanganate has been added. If it were not for the expense of this permanganate, it would be the best oxidant to use.

Sodium chlorate has been found to act satisfactorily, and while it acts slower in cold solution, it is believed that it acts with complete oxidation of the $V_2O_4$ to the pentavalent condition.

Chlorine oxidizes slowly and poorly, and the efficiency when utilizing chlorine would be low and the nuisance great because of the fact that chlorine is absorbed poorly by the phosphoric acid. As it has only one oxidizing valency compared to chlorate's six and potassium permanganate's five, it is not a cheap oxidant. What is said with reference to chlorine holds true to a considerable extent for bleaching powder. Ammonium persulphate oxidizes slowly and incompletely, at least in the cold. It is believed to be prohibitively expensive because of its cost and from the fact that it furnishes only two valencies for oxidation.

Barium dioxide oxidizes partially in the clod but as the loss of oxygen is great, the cost is believed to be prohibitive. Hydrogen peroxide acts peculiarly and gives a very unstable brown per-vanadium compound when added in large excess. A 400% excess gave in time a 56% oxidation to $V_2O_5$. Sodium bi-chromate is an effective oxidizing agent and oxidizes rapidly and quantitatively but has the disadvantage that it leaves $Cr_2O_3$ in the acid.

The phosphoric acid containing the vanadium as produced by the Anaconda Copper Mining Company from phosphate rock mined at Conda, Idaho, includes as impurities not only vanadium in the form of $V_2O_4$, but likewise includes an excess of sulphuric acid and impurities of iron, aluminum, calcium, manganese, magnesium, chromium, titanium, arsenic, fluorine, silica, nickel, sodium, boron, zinc, strontium and molybdenum, principally in the form of the oxides. Using this commercial grade of phosphoric acid containing vanadium and using the cold precipitation from 52° Bé. acid, and using potassium permanganate as the oxidizing agent produced an excellent, quick-settling precipitate of phosphatovanadate tetrahydrate, including either chemically combined or in solid solution some or many of the impurities above set forth.

In the crystallization of phosphate vanadate complex hydrates applicant has discovered that there are two principal forms which may be produced and which forms are $V_2O_5.P_2O_5.3H_2O$ and $V_2O_5.P_2O_5.4H_2O$; i. e., the tri- and tetrahydrates. The tetrahydrate was produced quantitatively by applicant by crystallization from a strong solution of phosphoric acid containing $V_2O_5$ at temperatures between 40° and 50° C. The transition point above which the tetrahydrate can not exist is higher the stronger the phosphoric acid. Applicant found that the optimum condition of operation is where one has a 50% $P_2O_5$ solution at 20° C.

The phosphatovanadic acid tetrahydrate $$V_2O_5.P_2O_5.4H_2O$$

occurs in crystallized spherules .002 to .10 centimeter in diameters that may be easily crushed to a mass of pointed needles. The crystal system could not be determined by applicant. The color of the crystals is greenish yellow, lemon yellow or pale orange, according to the impurities. The refractive index is a little over 1.5. The crystals are rather unstable to light, particularly in the presence of oganic matter. The crystals are slightly soluble in cold water and readily soluble in hot water to a red solution. The crystals are slightly soluble in alcohol or ether. The solubility of the pure form of phosphatovanadic acid trihydrate in cold 47% $P_2O_5$ is 0.08%. Impurities, particularly manganese, seem to decrease the water solubility and seem to increase the light stability of the crystals. The solubility of the crystals of the impure form in 40% $P_2O_5$ Anaconda phosphoric acid is about .22%. In the precipitation of the phosphatovanadic tetrahydrate from the Anaconda phosphoric acid, the crystals as precipitated take into their structure an extraordinarily large amount of the impurities contained in the Anaconda phosphoric acid. These impurities, particularly the manganese, distort greatly the ratio of $V_2O_5$ to $P_2O_5$. It is believed that the crystals of $V_2O_5.P_2O_5$ containing these impurities are just solid solutions.

The phosphatovanadic acid trihydrate $$V_2O_5.P_2O_5.3H_2O$$

is crystallized from a weaker solution of phosphoric acid above 40° to 50° C. The transition point goes up with the strength of the acid. The optimum conditions for precipitation of the trihydrate I have found to be with a 40% $P_2O_5$ solution and with a temperature of 60° C. The pure type of phosphatovanadic acid trihydrate occurs in crystalline square plates of the tetragonal system and less commonly in octagonal plates of the same system, the square plates being of 0.002 to 0.10 centimeter. The color of the crystals is yellow lemon to orange, according to the impurities. The trihydrate is less soluble and more slowly soluble in water than the tetrahydrate and is insoluble in alcohol and ether. The refractive index is a little higher than the tetrahydrate. As is true of the tetrahydrate, the trihydrate takes into its crystalline form a great variety of impurities, chiefly the sesquioxides.

As is true of the trihydrates, the ratio of $V_2O_5$ to $P_2O_5$ is greatly affected by these impurities, particularly by the manganese and these crystals are believed to be again mere solid solutions of impurities in the phosphatovanadic acid trihydrate.

I have found that in the trihydrate in the presence of solution there is a tendency exhibited for the trihydrate to change into the tetrahydrate so that it appears that the tetrahydrate is the final stable form.

Besides the tetra- and trihydrates of phosphatovanadic acid, there likewise occur other complex phosphatovanadic acid hydrates which have been extremely difficult to isolate. It has also been extremely difficult to actually determine their chemical composition and the exact formulae thereof. For example, one of the further complex phosphatovanadic acid hydrates that occur is apparently a complex hydrate of manganese oxide, iron oxide, phosphorus pentoxide and vanadium pentoxide which may possibly have the formula of $(Mn_2O_3.Fe_2O_3).(P_2O_5.V_2O_5).3H_2O$. This complex phosphatovanadic acid compound is crystalline in form. The form of the crystals is elliptical and the crystals are individual, not aggregates. In appearance the crystals resemble grains of barley, even to the hilum. It has been observed in cases that the crystals split on this hilum into two symmetrical halves. The crystal color is greenish brown. The size is always extremely minute and uniform and is about .002 centimeter. The refractive index is rather high.

Further types of crystals of phosphatovanadic acid hydrates are formed depending upon, to some extent, the oxidizing agent employed, and the impurities found in the phosphoric acid, for example, when potassium permanganate is employed for the purpose of oxidizing the vanadium constituent of the phosphoric acid, there is produced a further crystalline hydrate where the crystals are small cubes or cubo-octahedra usually with round corners and approximately .002 to 0.010 centimeter in diameter. The color is brown of various shades and the luster is resinous. The crystals seem to have a peculiar radial structure and are sometimes annularly banded. The crystals are insoluble in hot or cold water or hot or cold dilute sulphuric acid, but are readily soluble in hot concentrated sulphuric acid. This complex phosphatovanadic acid hydrate, the exact chemical composition of which to applicant is now unknown, is shown to be composed of vanadium pentoxide, phosphorus pentoxide, and to include manganese, iron, chromium, aluminum and arsenic, all as oxides, and of course the water of crystallization which is of such amount as to indicate that it is a trihydrate. There also is an indication that the impurities present distort the ratio of combined water in the crystalline hydrate.

In the precipitation of the tetrahydrate as an example I have found that when the tetrahydrate of phosphoric and vanadium oxides is precipitated from phosphoric acid containing no impurities other than vanadium, that the percent ratio of the phosphorus pentoxide to vanadium pentoxide is substantially the ratio of 46.22% $V_2O_5$ to 36.40% $P_2O_5$. In the precipitation of phosphate vanadate tetrahydrate from phosphoric acid containing the impurities above set forth, I have found as an example that the precipitated crystals include:

|  | Percent |
|---|---|
| $V_2O_5$ | 36.33 |
| $P_2O_5$ | 38.30 |
| $Mn_2O_3$ | 0.07 |
| $Fe_2O_3$ | 3.14 |
| $Cr_2O_3$ | 0.10 |
| $Al_2O_3$ | 1.17 |
| $As_2O_5$ | 0.07 |
| F | 0.90 |
| $SiO_2$ | 1.25 |
| Loss on ignition | 22.7 |
| $H_2O$ by difference | 18.77 |

The impurities will thus be seen to completely disrupt the $P_2O_5$ to $V_2O_5$ ratio. In the particular example above given, potassium permanganate was not used as the oxidizing agent. This accounts for the low percentage of $Mn_2O_3$ given in the above table as compared with the relatively high $Mn_2O_3$ percentages given in the later tables.

Further research upon this subject has shown me that many other forms of phosphatovanadic acid hydrates are formed, among which are apparently the metavanadato phosphoric acid which I have found formed under conditions of high temperatures, in fact, so high that all of the acid went over into the glacial form. The phosphatovanadate was largely changed to a form consisting of stout crystalline grains of yellow green color. Analysis of this compound indicated that it might be of the chemical composition of $(P_2O_5.V_2O_5).H_2O$.

In the precipitation of the phosphate vanadate complex crystals from dilute phosphoric acid containing other impurities such as manganese, iron, chromium, aluminum, arsenic, fluorine, silica, principally in the form of oxides and other elementary oxides, the crystals as precipitated carry with them these impurities, either in the form of complex compounds, the chemical formulae of which I have not been able to ascertain, or in the form of solid solutions. As the impurities increase, and the crystals bring with them on precipitation manganese, iron, chromium, aluminum, arsenic, fluorine and silica, principally in the form of the oxides, the percentage of $V_2O_5$ and $P_2O_5$ in the resultant crystals diminishes.

In the precipitation of trihydrate as an example, I have found that when the trihydrate of phosphorus and vanadium oxides is precipitated from pure phosphoric acid containing no impurities that the percentage ratio of phosphorus pentoxide to vanadium pentoxide is substantially in the ratio of 48.33% $V_2O_5$ to 37.7% $P_2O_5$. In the precipitation of this phosphate vanadate trihydrate from phosphoric acid containing the impurities as above set forth, I have found as an example that the precipitated crystals include:

|  | Percent |
|---|---|
| $V_2O_5$ | 36.86 |
| $P_2O_5$ | 36.04 |
| $Mn_2O_3$ | 2.16 |
| $Fe_2O_3$ | 2.34 |
| $Cr_2O_3$ | 0.15 |
| $Al_2O_3$ | 1.35 |
| $As_2O_5$ | 0.02 |
| No silicon. | |
| Fluorine | A large trace |

In the precipitation of a further form of crystalline trihydrate of phosphorus vanadium pentoxides from the impure phosphoric acid containing vanadium, that is, the precipitation of the crystals in the cubo-octahedral form, of which the color is brown, the composition of the precipitated crystals is substantially in the form of:

|  | Percent |
|---|---|
| $V_2O_5$ | 36.14 |
| $P_2O_5$ | 38.15 |
| $Mn_2O_3$ | 1.81 |
| $Fe_2O_3$ | 2.84 |
| $Cr_2O_3$ | 0.06 |
| $Al_2O_3$ | 1.16 |
| $As_2O_5$ | 0.01 |
| Loss on ignition | 20.6 |
| Fluorine | None |

The conditions of oxidation on precipitation of the crystals from the phosphoric acid containing the same and likewise containing other impurities depend upon the condition of concentration of the acid used, the conditions of temperature to be employed, and the particular oxidizing agent employed. As the impurities affect to a considerable degree the optimum conditions of operation at any given strength of acid and with any temperature which may be utilized, no fixed rule for the proper operation can be set forth. It is possible, however, to employ cold precipitation, that is, precipitation where the solution is maintained at substantially atmospheric temperature and with a relatively strong acid such as a 50° to 52° Bé. acid, and when using potassium permanganate as an example, to recover over 90% of the vanadium from the solution.

Other than using cold and rather concentrated precipitation as above set forth, it is possible to either use hot solution for the purpose of oxidation and then cooling to permit precipitation of the crystals, and it is likewise possible to employ more dilute acids than those hereinabove set forth. It is believed that under any condition of commercial operation of this process that a balance would be reached between the possible conditions of operation, i. e., the optimum for the particular acid as to its impurities, condition of concentration, and the facilities in hand for either maintaining hot or cold precipitation.

As an example of possible commercial operation, where a weak phosphoric acid containing the vanadium is used, the operation might be best carried out by adding an oxidizing agent such as sodium chlorate to the weak acid before the acid is concentrated. The oxidation of the vanadium to the pentavalent condition would take place, but because of the low concentration, no precipitation would occur. On subsequent concentration of the acid at boiling temperatures, the phosphatovanadate complex would not precipitate. Then on merely storing the concentrated acid and allowing the solution to cool, the precipitation would take place without further attention or operation being carried out.

The phosphatovanadate complex hydrate might be treated in any suitable manner to render the vanadium in a more usable form if found desirable. One method would be to digest the crystals with sufficient alkali, preferably sodium carbonate, to dissolve the vanadium and precipitate the bulk of the impurities; then separate the vanadate solution; then to precipitate a simple vanadate salt from the solution as, for example, by adding an ammonium salt such as ammonium sulphate to the separated solution. Ammonium metavanadate would be precipitated.

Having fully described my invention, it is to be understood that I do not wish to be limited to the details herein set forth, but my invention is of the full scope of the appended claims.

I claim:

1. In a method of recovery of vanadium from phosphoric acid containing the same, the steps of oxidizing a vanadium compound to the pentavalent condition, precipitating from the solution the phosphate vanadate complex crystals, digesting the phosphate vanadate complex hydrate crystals with an alkali carbonate, and then treating the resultant solution of phosphate vanadate with ammonium sulphate to precipitate ammonium metavanadate.

2. In a method of recovery of vanadium from phosphoric acid containing the same, the steps of oxidizing a vanadium compound to the pentavalent condition, precipitating from the solution crystals of a phosphatovanadate hydrate, digesting the crystals with an alkali carbonate, and then precipitating the vanadium from solution as a vanadate.

3. The method of recovering vanadium from phosphoric acid solutions containing small amounts of vanadium in a state of oxidation not greater than $V_2O_4$ which comprises oxidizing the vanadium content to $V_2O_5$ and precipitating complex compounds containing $V_2O_5$ and $P_2O_5$ from the solution at acid concentrations at which the complex compounds are insoluble.

4. The method of recovering vanadium from phosphoric acid solutions containing small amounts of vanadium in a state of oxidation not greater than $V_2O_4$, which comprises oxidizing the vanadium content to $V_2O_5$ and precipitating complex compounds containing $V_2O_5$ and $P_2O_5$ from the solution when the solution contains between approximately 40% and 54% $P_2O_5$.

5. The method of recovering vanadium from phosphoric acid solutions containing small amounts of vanadium in a state of oxidation not greater than $V_2O_4$ which comprises oxidizing the vanadium content with a chlorate, and precipitating complex compounds containing $V_2O_5$ and $P_2O_5$ from the solution at acid concentrations at which the complex compounds are insoluble.

6. The method of recovering vanadium from phosphoric acid solutions containing small amounts of vanadium in a state of oxidation not greater than $V_2O_4$, which comprises oxidizing the vanadium content to $V_2O_5$, bringing the concentration of $P_2O_5$ in said solution to within approximately 40% and 54% and precipitating complex compounds containing $V_2O_5$ and $P_2O_5$ from the solution.

7. The method of recovering small amounts of vanadium from impure phosphoric acid solutions containing impurities in which solution the vanadium content is in a state of oxidation not greater than $V_2O_4$ which comprises oxidizing the vanadium content to $V_2O_5$, and then precipitating complex compounds containing $V_2O_5$ and $P_2O_5$ from this solution at acid concentrations at which the complex compounds are insoluble.

8. The process of recovering small amounts of vanadium from phosphoric acid containing impurities such as oxides of iron, aluminum and arsenic which comprises adding to the phosphoric acid solution an oxidizing agent to oxidize the vanadium content thereof to $V_2O_5$ and precipitating complex compounds containing $V_2O_5$ and $P_2O_5$ from the solution at acid concentrations at which the complex compounds are insoluble.

9. The method of recovering vanadium from phosphoric acid solutions containing less than 1% of vanadium in a state of oxidation not greater than $V_2O_4$ which comprises oxidizing the vanadium content to $V_2O_5$ and precipitating complex compounds containing $V_2O_5$ and $P_2O_5$ from the solution at acid concentrations at which the complex compounds are insoluble.

10. A chemical composition of phosphorous oxide and pentavalent oxide of vanadium crystallized as spherules of tetrahydrate form, the refractive index of which is in excess of 1.5 and having a solubility in 40% $P_2O_5$ at ordinary temperature of 0.22% $V_2O_5$ or less.

11. A chemical composition of phosphorous and vanadium pentoxides of trihydrate crystalline form, the crystals being substantially square plates of the tetragonal system having a refractive index in excess of 1.5 and being substantially insoluble in 40% $P_2O_5$ at 60° centigrade.

12. The method of recovering vanadium from phosphoric acid solutions containing small amounts of vanadium in a state of oxidation not greater than $V_2O_4$, which comprises oxidizing the vanadium content to $V_2O_5$ in a solution having a $P_2O_5$ concentration such that $V_2O_5.P_2O_5.3H_2O$ will precipitate therefrom, and precipitating $$V_2O_5.P_2O_5.3H_2O$$

from the solution.

13. The method of recovering vanadium from phosphoric acid solutions containing small amounts of vanadium in a state of oxidation not greater than $V_2O_4$ which comprises oxidizing the vanadium content to $V_2O_5$, bringing the solution to a concentration of $P_2O_5$ such that $$V_2O_5.P_2O_5.3H_2O$$

will precipitate therefrom and precipitating $V_2O_5.P_2O_5.3H_2O$ from the solution.

14. The method of recovering vanadium from phosphoric acid solutions containing small amounts of vanadium in a state of oxidation not greater than $V_2O_4$ which comprises oxidizing the vanadium content to $V_2O_5$ in a solution having a $P_2O_5$ concentration such that $V_2O_5.P_2O_5.4H_2O$ will precipitate therefrom, and precipitating $$V_2O_5.P_2O_5.4H_2O$$

from the solution.

15. The method of recovering vanadium from phosphoric acid solutions containing small amounts of vanadium in a state of oxidation not greater than $V_2O_4$ which comprises oxidizing the vanadium content to $V_2O_5$, bringing the solution to a concentration of $P_2O_5$ such that $$V_2O_5.P_2O_5.4H_2O$$

will precipitate therefrom and precipitating $V_2O_5.P_2O_5.4H_2O$ from the solution.

FREDERIC C. BOWMAN.